(12) United States Patent
Minamide et al.

(10) Patent No.: US 9,933,580 B2
(45) Date of Patent: Apr. 3, 2018

(54) OPTICAL FIBER PENETRATION

(71) Applicant: ORIENT BRAINS CO., LTD., Suita-shi, Osaka (JP)

(72) Inventors: Koji Minamide, Suita (JP); Daisuke Minamide, Toyonaka (JP)

(73) Assignee: ORIENT BRAINS CO., LTD., Suita-Shi, Osaka (JP)

( * ) Notice: Subject to any disclaimer, the term of this patent is extended or adjusted under 35 U.S.C. 154(b) by 0 days.

(21) Appl. No.: 15/501,190

(22) PCT Filed: Aug. 5, 2015

(86) PCT No.: PCT/JP2015/072278
§ 371 (c)(1),
(2) Date: Feb. 2, 2017

(87) PCT Pub. No.: WO2016/021659
PCT Pub. Date: Feb. 11, 2016

(65) Prior Publication Data
US 2017/0227717 A1 Aug. 10, 2017

(30) Foreign Application Priority Data
Aug. 8, 2014 (JP) .................. 2014-163007

(51) Int. Cl.
*G02B 6/38* (2006.01)
*G02B 6/46* (2006.01)
(Continued)

(52) U.S. Cl.
CPC ......... *G02B 6/3816* (2013.01); *G02B 6/3893* (2013.01); *G02B 6/443* (2013.01); *G02B 6/46* (2013.01); *G21C 13/036* (2013.01)

(58) Field of Classification Search
None
See application file for complete search history.

(56) References Cited

U.S. PATENT DOCUMENTS 4,553,812 A 11/1985 Kojiro et al.
6,464,405 B2 * 10/2002 Cairns .................. G02B 6/3816
385/139
(Continued)

FOREIGN PATENT DOCUMENTS

JP 58-215609 A 12/1983
JP 61-239202 A 10/1986
(Continued)

OTHER PUBLICATIONS

International Preliminary Report on Patentability and Written Opinion of the International Searching Authority (Forms PCT/IB/338, PCT/IB/373, PCT/ISA/237, and PCT/IB/236) dated Feb. 23, 2017, by the International Bureau of WIPO, in corresponding International Application No. PCT/JP2015/072278 and an English Translation. (14 pages).

(Continued)

*Primary Examiner* — Tina Wong
(74) *Attorney, Agent, or Firm* — Buchanan Ingersoll & Rooney PC

(57) ABSTRACT

An optical fiber penetration is disposed in a sleeve provided through a partition wall that separates a first space and a second space. The optical fiber penetration includes a first optical fiber cable and a second optical fiber cable each having a thin tube formed of metal and an optical fiber strand inserted in the thin tube, a cylindrical body that is formed of metal and is disposed in an axial direction of the sleeve, an interior of which includes the first optical fiber cable on a side of the first space and the second optical fiber cable on a side of the second space, an internal connector configured to connect the first optical fiber cable with the second optical fiber cable in the interior of the cylindrical body, and a first lid and a second lid configured to close one end and the other end of the cylindrical body.

10 Claims, 7 Drawing Sheets

(51) Int. Cl.
*G02B 6/44* (2006.01)
*G21C 13/036* (2006.01)

(56) References Cited

U.S. PATENT DOCUMENTS

| | | | | |
|---|---|---|---|---|
| 6,910,910 | B2* | 6/2005 | Cairns ................ | G02B 6/3816 |
| | | | | 174/13 |
| 7,285,003 | B2* | 10/2007 | Cairns ................ | H01R 13/521 |
| | | | | 439/353 |
| 8,944,082 | B2* | 2/2015 | Cairns ................ | F16L 29/005 |
| | | | | 137/1 |
| 9,088,094 | B2* | 7/2015 | Iyer ..................... | H01R 13/53 |
| 2006/0160430 | A1* | 7/2006 | Siddiqi ............... | H01R 13/523 |
| | | | | 439/700 |

FOREIGN PATENT DOCUMENTS

| | | |
|---|---|---|
| JP | 5-196847 A | 8/1993 |
| JP | 2004-157050 A | 6/2004 |

OTHER PUBLICATIONS

International Search Report (PCT/ISA/210) dated Oct. 13, 2015, by the Japanese Patent Office as the International Searching Authority for International Application No. PCT/JP2015/072278.
Written Opinion (PCT/ISA/237) dated Oct. 13, 2015, by the Japanese Patent Office as the International Searching Authority for International Application No. PCT/JP2015/072278.

* cited by examiner

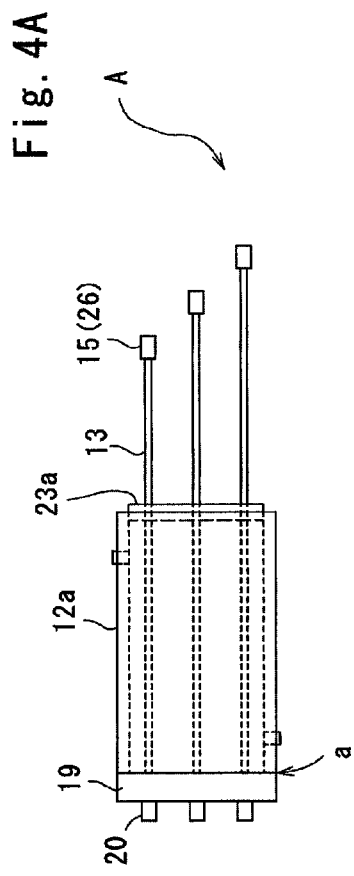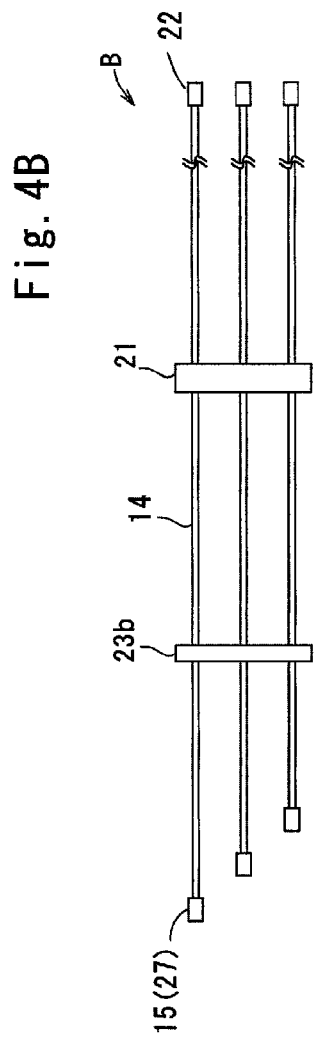

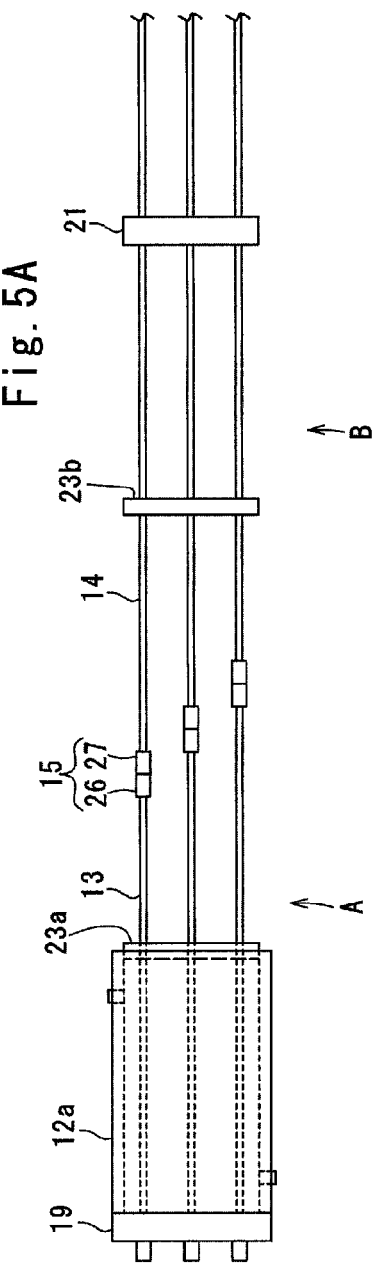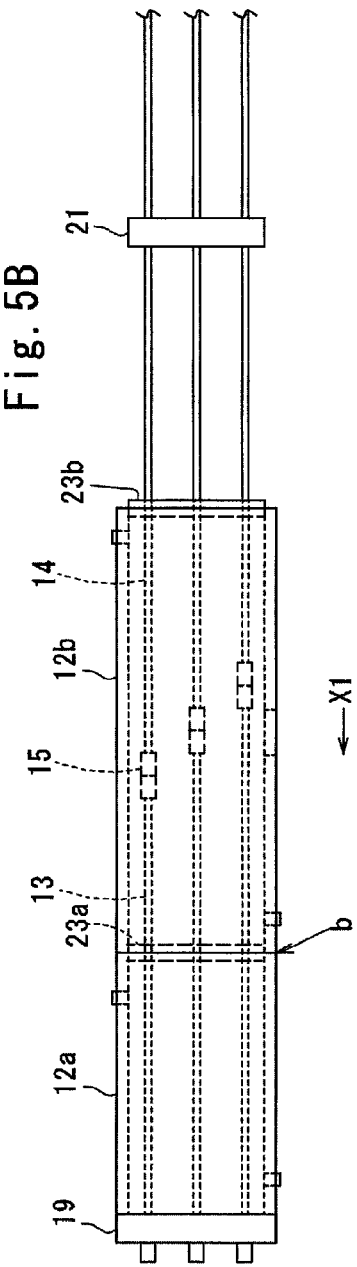

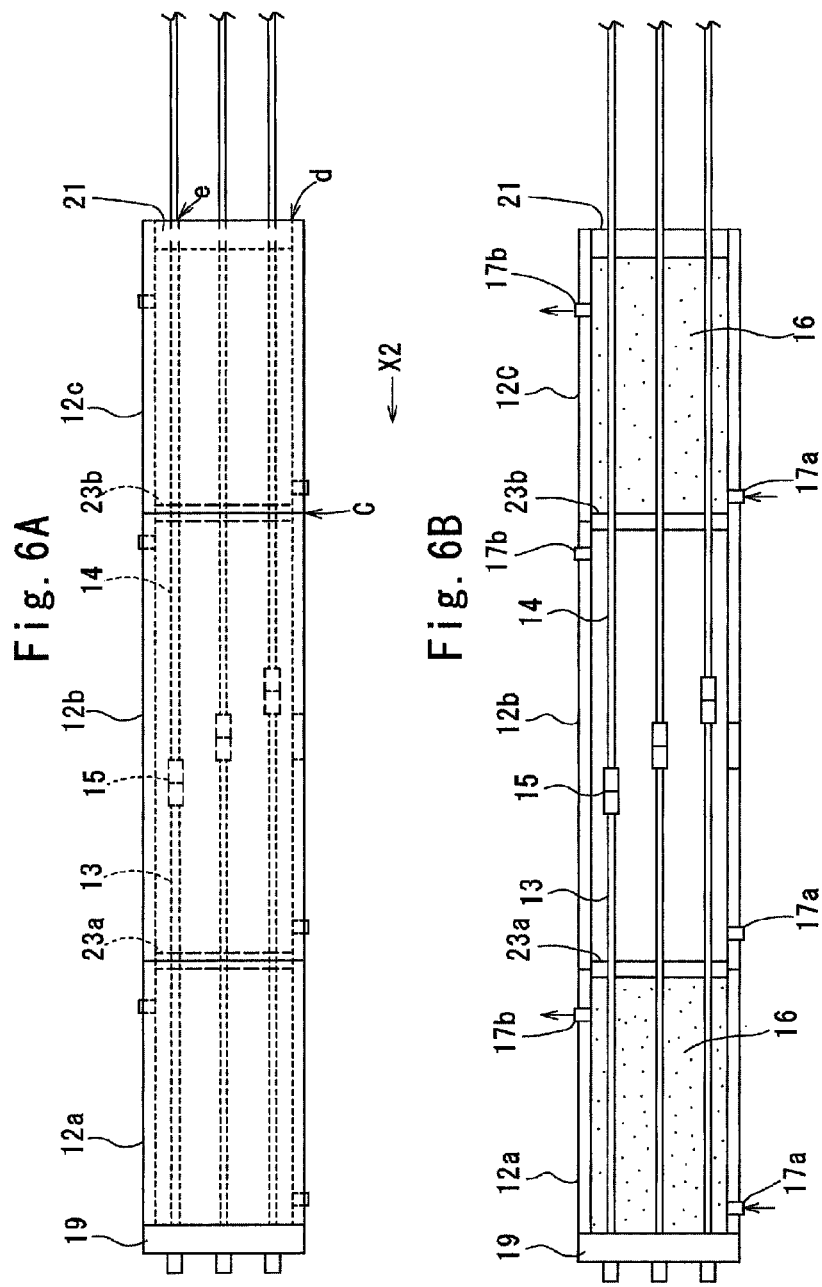

OPTICAL FIBER PENETRATION

TECHNICAL FIELD

The present invention relates to an optical fiber penetration configured to penetrate a partition wall provided in a container, a facility, or a room such as a nuclear reactor containment, a shelter, a safe, an airtight area of a chemical plant, which requires separation between inside and outside thereof in order to connect cables extending the inside and the outside of the partition wall.

BACKGROUND ART

Patent document 1 discloses a conventional penetration in which: a header ring is provided through an adaptor on an external end of a sleeve which penetrates a shielding wall of a nuclear reactor containment; a plurality of cable modules are mounted on the header ring; outside cables of the cable modules are connected with external cables through terminal parts; and inside cables of the cable modules are connected with internal cables through terminal parts. When such a penetration is in need of replacement, a welded part between the adaptor and the sleeve is cut to replace the cable modules together with the adaptor with a new one.

Since the recent nuclear power plant accident in Japan, there has been a need for enhancing safety monitoring facilities and instrumentation facilities in nuclear reactor containments. Due to an issue of radiation resistance of optical fibers, optical fibers have not been used in Japan for transmitting the measured data of temperatures and the water levels in the nuclear reactor containments.

While radiation-resistant fibers have been developed in recent years, it has been desired to develop measuring instruments, such as hydrogen detection sensors, temperature sensors, and water level sensors, corresponding to such radiation-resistant fibers and also to develop an optical fiber penetration of a partition wall of a nuclear reactor containment having pressure resistance, airtightness, heat resistance, and radiation resistance.

However, the radiation-resistant fibers as they are cannot be used as a penetration, since resin coating thereof lacks heat resistance and pressure resistance, and in addition, a fiber strand alone is easy to break and lacks durability. The radiation-resistant fibers need airtightness and durability to be used as a penetration of a shield wall of a nuclear reactor containment.

PRIOR ART DOCUMENTS

Patent document 1: JP 2004-157050 A

SUMMARY OF INVENTION

Technical Problems

The present invention has been made in view of the above problems, and an object thereof is to provide an optical fiber penetration using a radiation-resistant fiber and having pressure resistance, airtightness, heat resistance, radiation resistance, and water resistance.

Solutions to Problems

To solve the above problems, there is provided an optical fiber penetration to be disposed in a sleeve provided through a partition wall that separates a first space and a second space, the optical fiber penetration including a first optical fiber cable and a second optical fiber cable each having a thin tube formed of metal and an optical fiber strand inserted in the thin tube, a cylindrical body that is formed of metal and is disposed in an axial direction of the sleeve, an interior of which includes the first optical fiber cable on a side of the first space and the second optical fiber cable on a side of the second space, an internal connector configured to connect the first optical fiber cable with the second optical fiber cable in the interior of the cylindrical body, and a first lid and a second lid configured to close one end and the other end of the cylindrical body respectively. The internal connector separates an interior of the thin tube of the first optical fiber cable and an interior of the thin tube of the second optical fiber cable, and electrically connects the optical fiber strand of the first optical fiber cable with the optical fiber strand of the second optical fiber cable.

Since the optical fiber strand of each of the first optical fiber cable and the second optical fiber cable is inserted in the thin tube, the optical fiber strand is protected and also the first optical fiber cable and the second optical fiber cable have pressure resistance, heat resistance, and radiation resistance.

In addition, the internal connector separates the interior of the thin tube of the first optical fiber cable and the interior of the thin tube of the second optical fiber cable, while electrically connecting the optical fiber strand of the first optical fiber cable with the optical fiber strand of the second optical fiber cable. With this structure, even when the thin tube of the optical fiber cable on the side of the first space of the partition wall connected to the first optical fiber cable is damaged, the atmosphere or water in the first space does not enter the optical fiber cable in the second space from the damaged thin tube, thereby maintaining water resistance and airtightness.

The internal connector preferably includes a socket to which an end of the thin tube of the first optical fiber cable is fixed, and which includes either a female contact or a male contact at a tip end of the optical fiber strand of the first optical fiber cable, and a plug to which an end of the thin tube of the second optical fiber cable is fixed, and which includes either a male contact or a female contact engaged with the contact in the socket, at a tip end of the optical fiber strand of the second optical fiber cable, and a periphery of the optical fiber strand of the second optical fiber cable is preferably sealed with a resin to an interior of the plug, and the plug is preferably configured to be attached to the socket in such a manner that the female contact and the male contact are engaged with each other.

While the internal connector electrically connects the optical fiber strand of the first optical fiber cable with the optical fiber strand of the second optical fiber cable, the interior of the thin tube of the first optical fiber cable is separated from the interior of the thin tube of the second optical fiber cable with a simple configuration of only connecting the plug to the socket.

The interior of the cylindrical body is preferably filled with a resin.

Since the resin fills the interior of the cylindrical body, the internal connector, the first optical fiber cable, and the second optical fiber cable are sealed with the resin, thereby further improving the airtightness inside the cables to protect the optical fiber.

The optical fiber penetration preferably further includes a partition plate that is provided in the interior of the cylindrical body to support the first optical fiber cable and the second optical fiber cable and to divide the interior of the cylindrical body into a plurality of spaces, and the resin preferably fills at least one space including the internal connector among the spaces divided by the partition plate.

The interior of the cylindrical body is divided into the spaces and the temperatures of the spaces are individually controlled, thereby preventing shrinkage or expansion of the resin and facilitating a curing process of the resin.

The resin is preferably a mixed resin in which a cyanate ester resin and an epoxy resin are mixed with each other.

Since the above mixed resin is employed, the resin is cured at temperatures 150° C. or less after filling the cylindrical body with the resin, thereby preventing damage to the optical fiber caused by high temperatures.

Advantageous Effects of Invention

According to an optical fiber penetration and a system of the present invention, while the optical fiber of the first cable and an optical fiber of the second cable are electrically connected with each other, the connector ensures airtightness of each of the cables to prevent intrusion of radiation rays, heat, and water, thereby protecting the optical fibers.

BRIEF DESCRIPTION OF DRAWINGS

FIGS. 4A, 4B are front views of an inner unit and an outer unit of the optical fiber penetration in an assembly state.

FIGS. 5A, 5B are front views of the optical fiber penetration in the assembly state.

FIGS. 6A, 6B are a front view and a sectional view of the optical fiber penetration in the assembly state.

DESCRIPTION OF EMBODIMENTS

An Embodiment of the present invention is described below with reference to the drawings.

Figure 1:
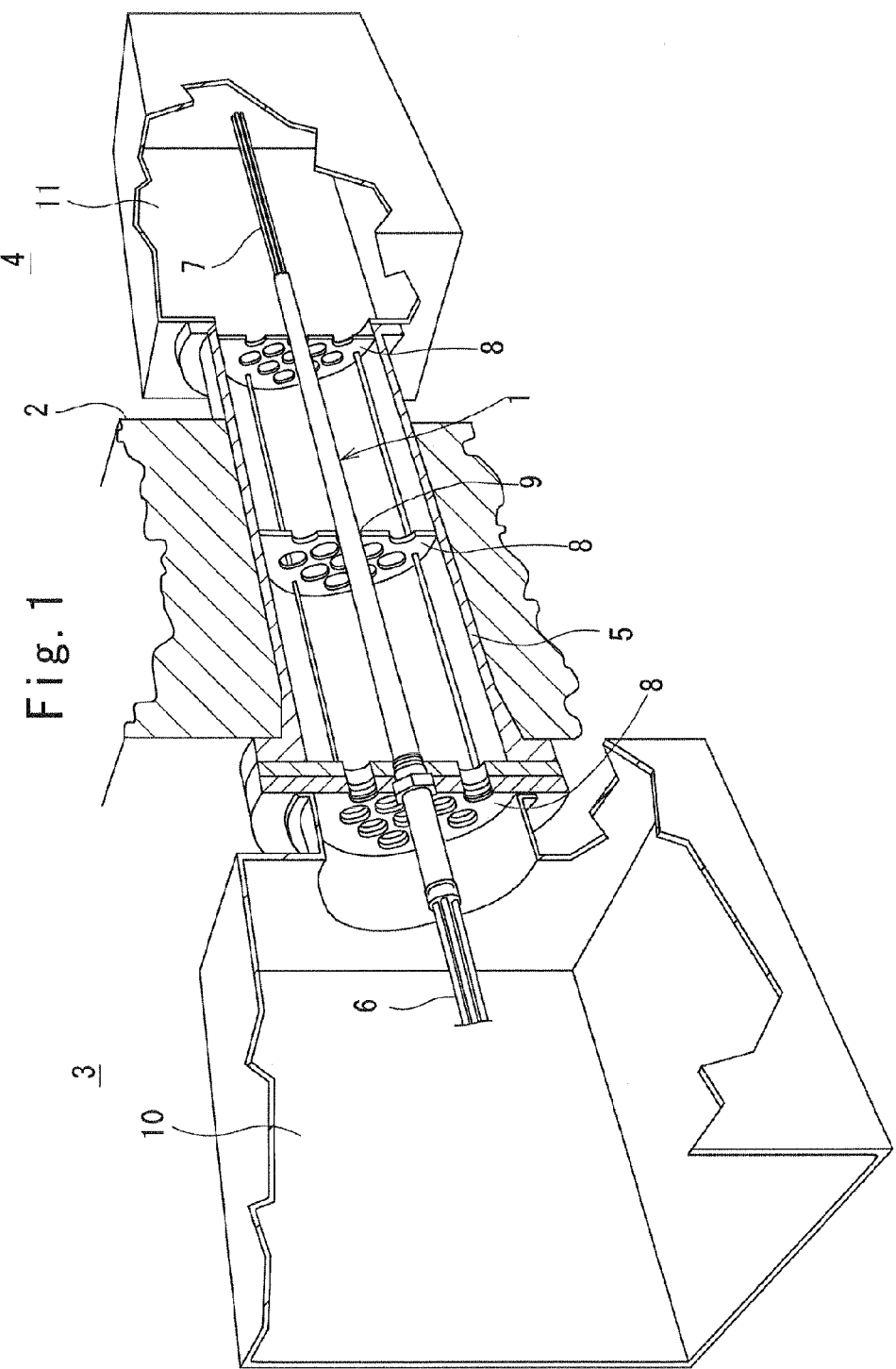
FIG. 1 is a perspective view showing a state in which an optical fiber penetration according to an embodiment of the present invention is placed in a partition wall of a nuclear reactor containment.

Referring to FIG. 1, an optical fiber penetration 1 according to the embodiment is placed in a cylindrical sleeve 5 penetrating a partition wall 2 of a nuclear reactor containment to communicate an inner space (first space) 3 of the containment on the left side in FIG. 1 (inside of the partition wall 2) and an outer space (second space) 4 of the containment on the right side in FIG. 1 (outside of the partition wall 2) with each other. Note that a part of each component toward the inside of the nuclear reactor containment and a part of each component toward the outside of the nuclear reactor containment are simply indicated by using the terms "inner" and "outer" respectively in the present specification for the purpose of convenience.

The optical fiber penetration 1 joins inner optical fiber cables 6, which are connected with a sensor (not shown) disposed in the inner space 3 of the containment, to outer optical fiber cables 7, which is connected with a reading device (not shown) disposed in the outer space 4 of the containment.

The optical fiber penetration 1 extends in an axial direction of the sleeve 5 from the inner space 3 to the outer space 4 of the containment. The optical fiber penetration 1 is inserted in and supported by circular holes 9 of support bodies 8 that are provided on both ends and in the middle in the axial direction of the sleeve 5. Note that FIG. 1 shows a single optical fiber penetration 1 as a typical example, but in a practical structure, there are provided a plurality of the optical fiber penetrations 1 and electrical penetrations in the sleeve 5. The inner optical fiber cables 6 and other cables are concentrated into an inner connection box 10 attached to an inner end of the sleeve 5 to be connected with their respective penetrations. In the same manner, the outer optical fiber cables 7 and other cables are concentrated into an outer connection box 11 attached to an outer end of the sleeve 5 to be connected with their respective penetrations.

Figure 2:
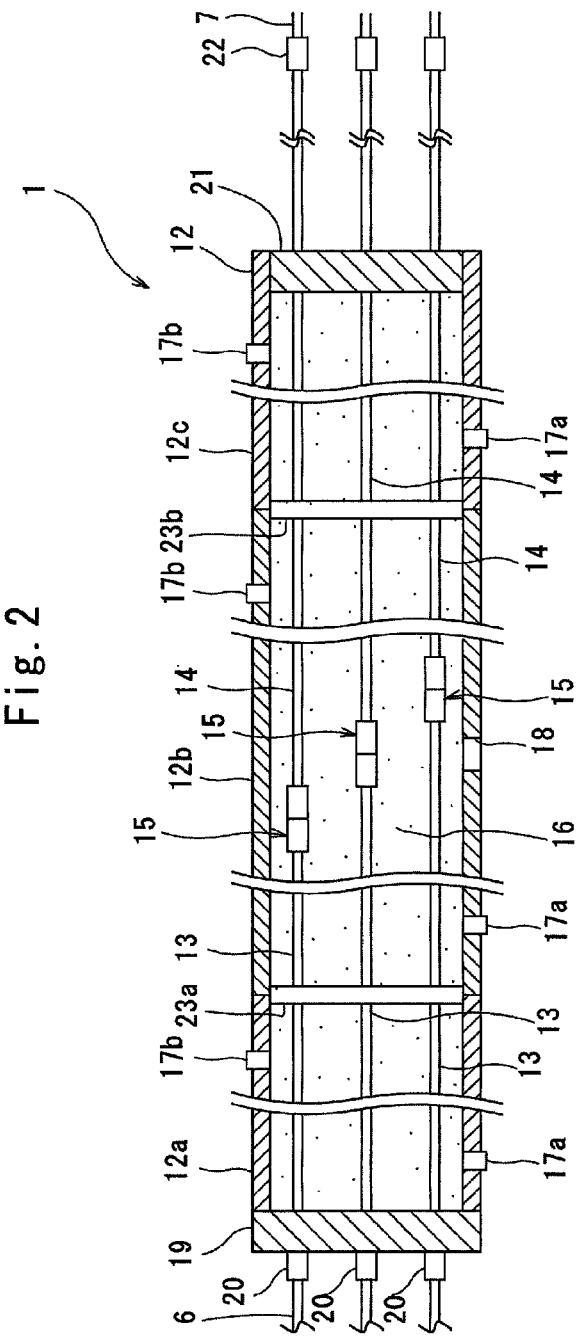
FIG. 2 is a sectional view of the optical fiber penetration of FIG. 1.

Referring to FIG. 2, the optical fiber penetration 1 includes a metal cylindrical body 12 with both ends closed, a plurality of first optical fiber cables 13 inserted in the cylindrical body 12 on the side of the inner space 3 of the containment, a plurality of second optical fiber cables 14 inserted in the cylindrical body 12 on the side of the outer space 4 of the containment, and a plurality of internal connectors 15 configured to respectively connect the first optical fiber cables 13 to the second optical fiber cables 14. A space inside the cylindrical body 12 of the optical fiber penetration 1 is filled with a resin 16. The internal connectors 15 are arranged at different positions in a longitudinal direction of the optical fiber cables 13, 14 so as not to overlap each other.

The diameter of the cylindrical body 12 depends on the number of the optical fiber cables 13, 14 inserted therein (16 cables in ordinary cases) and the size of the internal connectors 15, ranging from approximately 100 mm to 200 mm. The length of the cylindrical body 12 depends on the length of the sleeve 5 in which the optical fiber penetration 1 is disposed, i.e., the thickness of the partition wall 2, ranging from approximately 1000 mm to 3000 mm. The cylindrical body 12 is formed of three pipes 12a, 12b, 12c, which are made of metal such as stainless steel, and is formed by welding the end surfaces of adjacent ones of the pipes 12a, 12b, 12c. Each of the pipes 12a, 12b, 12c includes a resin filling port 17a and an exhaust port 17b. The second pipe 12b which is the middle one of the pipes, includes a gas leak detection hole 18. The gas leak detection hole 18 is connected to a pressure gauge (not shown), which is provided inside or outside, through a conduit (not shown), and is configured to detect a change of a pressure inside the cylindrical body 12 due to a damage or the like of a thin tube 24 (described in a following passages) of the optical fiber cables 13, 14 or the cylindrical body 12.

The inner end of the first pipe 12a abuts and is welded to a first lid 19 having a disk shape. A plurality of first connectors 20 are fixed to the first lid 19 and are connected with inner ends of the first optical fiber cables 13, respectively. The first connectors 20 may be respectively attached to the ends of the first optical fiber cables 13 that penetrate the first lid 19, without fixing to the first lid 19. A second lid 21 having a disk shape is inserted in and is welded to the outer end of a third pipe 12c. The plurality of second optical fiber cables 14 penetrate the second lid 21 in a thickness direction, and second connectors 22 are respectively attached to the ends of the second optical fiber cables 14. The second connectors 22 may be fixed to the second lid 21 in the same manner as the first connectors 20 without attaching to the ends of the second optical fiber cables 14.

The inner optical fiber cables 6 are respectively connected to the first connectors 20, and the ends of the inner optical fiber cables 6 are attached to the above mentioned sensor. To the second connectors 22 are respectively connected the outer optical fiber cables 7, and the ends of which are connected to the above mentioned reading device. This enables the sensor and the reading device to be easily connected with each other through the inner optical fiber cables 6, the first connectors 20, the optical fiber penetration 1, the second connectors 22, and the outer optical fiber cables 7.

The first optical fiber cables 13 and the second optical fiber cables 14 are supported by circular partition plates 23a, 23b that are provided at welded portions between the first pipe 12a and the second pipe 12b and between the second pipe 12b and the third pipe 12c, respectively.

Figure 3:
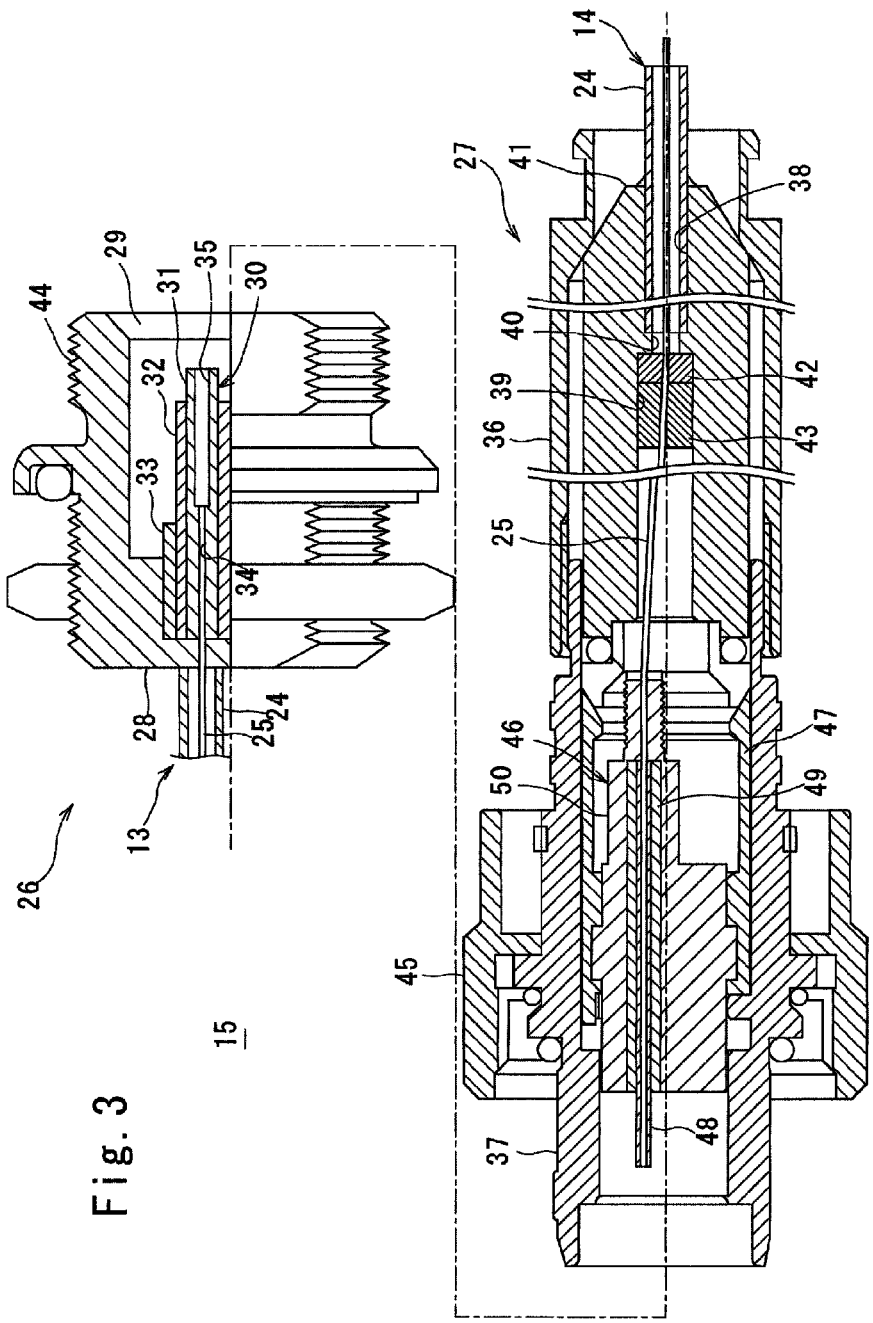
FIG. 3 is a sectional view of an internal connector of the optical fiber penetration.

Referring to FIG. 3, each of the first optical fiber cables 13 and the second optical fiber cables 14 includes the thin tube 24 made of stainless steel and an optical fiber strand 25 inserted in the thin tube 24. Each of the inner optical fiber cables 6 and the outer optical fiber cables 7 has the same structure.

The thin tube 24 is preferably a stainless steel tube and has the following properties.
material: SUS304 (or SUS316)
outer diameter/thickness: 2.0±0.05 mm/0.2±0.05 mm
allowable tensile strength: 216 N
permissible lateral pressure: 20,000 N/50 mm
working temperatures: from room temperatures to 200° C.

The optical fiber strand 25 is preferably a radiation resistant optical fiber strand disclosed by Japanese Patent No. 4699267, and a radiation resistant single-mode optical fiber (RRSMFB) which is formed by coating a F—$SiO_2$ fiber (approximately 0.8% of fluorine is added) with a polyimide resin and is capable of suppressing and repairing damages caused by radiation and having the following properties.
cladding diameter: 125±1 μm
wavelengths used: 1310 nm, 1550 nm
initial transmission loss: ≤0.5 dB/km
pressure resistant test: ≥0.7 $GN/m^2$
heat resistance: 300° C.
transmission loss by γ-irradiation: $1 \times 10^6$ R/h about 0.5 dB/100 m
$1 \times 10^5$ R/h about 0.3 dB/100 m The thermosetting resin 16 that fills the internal space of the optical fiber penetration 1 is a mixed resin obtained by mixing a cyanate ester resin and an epoxy resin at a ratio of four to six.

Referring to FIG. 3, each of the internal connectors 15 is an underwater connector including a socket 26 and a plug 27 to be connected to the socket 26. Each of the first connectors 20 and the second connectors 22 has the same structure, and thus the descriptions thereof are omitted.

The socket 26 has a cylindrical shape with one end being closed by a wall 28 and the other end being an open end 29 to which the plug 27 is inserted. Each of the first optical fiber cables 13, which is provided on the side of the socket and is connected to the sensor in the inner space 3 of the containment (see FIG. 1) penetrates a wall 28 to extend inside the socket 26. An end part of the optical fiber strand 25 of each of the first optical fiber cables 13 is held by a first holding part 30, which is fixed to the socket 26, and is retained inside the socket 26. A tip end of the thin tube 24 of each of the first optical fiber cables 13 is welded to the wall 28 of the socket 26.

The first holding part 30 includes a female contact 31, a contact fixing part 32, and a holding ring 33.

The female contact 31 includes an optical fiber holding hole 34 and a contact insertion hole 35. The end part of the optical fiber strand 25 of each of the first optical fiber cables 13 is inserted in and fixed to the optical fiber holding hole 34. The diameter of the contact insertion hole 35 is larger than that of the optical fiber holding hole 34, and receives a male contact 48 of the plug 27 (described below).

The contact fixing part 32 has a cylindrical shape shorter in the axial direction than the female contact 31, and is arranged between the female contact 31 and the holding ring 33. The female contact 31 is inserted in the contact fixing part 32.

The holding ring 33 has a cylindrical shape shorter in the axial direction than the contact fixing part 32. The contact fixing part 32 is inserted in the holding ring 33 fixed to the inner surface of the socket 26.

The plug 27 has a cylindrical shape extending in the axial direction, and includes a cable sealing body 36 configured to seal each of the second optical fiber cables 14, and a plug body 37 connected and fixed to the cable sealing body 36.

The cable sealing body 36 seals the tip end of the thin tube 24 of each of the second optical fiber cables 14. The cable sealing body 36 has a cylindrical shape, and includes a cable holding hole 38 extending in the axial direction, a resin-filled hole 39, and a step part 40. The cable holding hole 38 is smaller in diameter than the resin-filled hole 39, and is connected to the resin-filled hole 39 through the step part 40.

The thin tube 24 of each of the second optical fiber cables 14 is inserted in the cable holding hole 38, and the end of the thin tube 24 is engaged with the step part 40. The outer end surface 41 of the cable sealing body 36 and the thin tube 24 are fastened together by welding.

An end part of the resin-filled hole 39 on the side of the step part 40 is filled with a high-viscosity resin 42. A part next to the high-viscosity resin 42 is filled with a low-viscosity resin 43. The resins 42, 43 are preferably epoxy resins, but are not limited thereto. This secures the airtightness inside the thin tube 24 of each of the second optical fiber cables 14 to prevent intrusion of radiation rays, heat, and water, thereby protecting the optical fiber strand 25.

The tip end of the plug body 37 is inserted in the socket 26. The outer periphery of the plug body 37 includes a connection ring 45 to be screw-connected with the male thread 44 formed on the outer periphery of the socket 26. The second holding part 46 configured to hold the optical fiber strand 25 of each of the second optical fiber cables 14 is fixed to the inside of the plug body 37 through a thin annular body 47, which is fitted to the inner peripheral surface of the plug body 37.

The optical fiber strand 25, which extends in the plug 27 from the each of the second optical fiber cables 14, penetrates through the epoxy resins 42, 43 and extends to the second holding part 46. The second holding part 46 includes a male contact 48, a contact holding ring 49, and a contact fixing part 50.

The male contact 48 has a cylindrical shape to hold an end part of the optical fiber strand 25 of each of the second optical fiber cables 14. A tip end of the male contact 48 projects toward the socket 26 from end surfaces of the contact holding ring 49 and the contact fixing part 50.

The contact holding ring 49 has a cylindrical shape shorter in the axial direction than the male contact 48, and is disposed between the male contact 48 and the contact fixing part 50. The contact fixing part 50 is shorter in the axial direction than the male contact 48, and has a cylindrical shape having the same length as the contact holding ring 49.

The contact fixing part 50 is fixed to the inner peripheral surface of the plug 27 through the annular body 47, and the contact holding ring 49 is inserted in the contact fixing part 50.

Then, a method for manufacturing the optical fiber penetration 1 according to the present invention and a method for attaching the partition wall 2 of the nuclear reactor containment to the sleeve 5 are described below.

Referring to FIGS. 4A, 4B, an inner unit A is assembled by fixing the first lid 19 to the first pipe 12a by welding at position "a" shown in the figure, inserting the first optical fiber cables 13 from the outer end of the first pipe 12a while being supported by the first partition plate 23a, inserting the inner ends of the first optical fiber cables 13 into the first lid 19 to be respectively attached to the first connectors 20, attaching the first connectors 20 to the first lid 19, and attaching the sockets 26 of the internal connectors 15 respectively to the outer ends of the first optical fiber cables 13 so that the first partition plate 23a is located at the outer end of the first pipe 12a. The thin tube 24 of each of the first optical fiber cables 13 is preferably fixed to the first partition plate 23a by welding or the like, but may not be necessarily fixed.

Subsequently, an outer unit B is assembled by inserting the second optical fiber cables 14 into the second lid 21 while being held by the second partition plate 23b, attaching the plugs 27 of the internal connectors 15 respectively to the inner ends of the second optical fiber cables 14, and attaching the second connectors 22 respectively to the outer ends of the second optical fiber cables 14. The thin tube 24 of each of the second optical fiber cables 14 is also preferably fixed to the second partition plate 23b by welding or the like, but may not be necessarily fixed.

Next, referring to FIGS. 5A, 5B, the sockets 26 of the internal connectors 15 in the inner unit A are respectively connected to the plugs 27 of the internal connectors 15 in the outer unit B so that the first optical fiber cables 13 are respectively connected to the second optical fiber cables 14. The second pipe 12b is introduced from the outer end of the second optical fiber cables 14 in the direction of arrow X1 in the figure, and the outer end of the first pipe 12a and the inner end of the second pipe 12b are welded together at position "b" in the figure. At this time, the first partition plate 23a is also welded to the inner peripheral surfaces of the first pipe 12a and the second pipe 12b.

Referring to FIGS. 6A, 6B, the third pipe 12c is introduced from the outer end of the second optical fiber cables 14 in the direction of arrow X2 in the figure so that the outer end of the second pipe 12b and the inner end of the third pipe 12c are welded together at position "c" in the figure. At this time, the second partition plate 23b is also welded to the inner peripheral surfaces of the second pipe 12b and the third pipe 12c. Then, the outer end of the third pipe 12c is welded to the outer end of the second lid 21 at position "d" in the figure, and the thin tube 24 of each of the second optical fiber cables 14 is welded to the second lid 21 at position "e" in the figure.

Subsequently, a thermosetting resin 16, in which a cyanate ester resin and an epoxy resin are mixed at a ratio of four to six for example, is introduced from the resin filling port 17a to fill an internal space of the first pipe 12a between the first lid 19 and the first partition plate 23a, and then solidified. In the same manner, the thermosetting resin 16 is introduced from the resin filling port 17a to fill an internal space of third pipe 12c between the second lid 21 and the second partition plate 23b and an internal space of the second pipe 12b between the first partition plate 23a and the second partition plate 23b, and then solidified.

Since the cylindrical body 12 is divided into the spaces by the partition plates 23a, 23b, the temperatures of the spaces are individually controlled, thereby preventing shrinkage and expansion of the thermosetting resin and also facilitating a curing process of the thermosetting resin.

In addition, since the above described mixed resin is used as the resin 16, the resin 16 can be cured at temperatures of 150° C. or less, thereby preventing damages to the optical fibers caused by high temperatures.

A new optical fiber penetration 1 manufactured in the above described manner can be easily attached to the sleeve 5 of the partition wall 2 of the nuclear reactor containment, by inserting the optical fiber penetration 1 in the sleeve 5 from the outside of the nuclear reactor containment, connecting the inner first connectors 20 respectively to the inner optical fiber cables 6, and connecting the outer second connectors 22 respectively to the outer optical fiber cables 7. In addition, the optical fiber penetration 1 can be easily replaced by detaching the first connectors 20 and the second connectors 22 of the current optical fiber penetration 1 respectively from the inner optical fiber cables 6 and the outer optical fiber cables 7, drawing outwardly and removing the current optical fiber penetration 1 from the sleeve 5, then inserting a new optical fiber penetration 1 in the sleeve 5 from the outside of the nuclear reactor containment, connecting the inner first connectors 20 respectively to the inner optical fiber cables 6, and connecting the outer second connectors 22 respectively to the outer optical fiber cables 7.

Each of the first optical fiber cables 13 and each of the second optical fiber cables 14 used in the optical fiber penetration 1 according to the present invention, have a structure in which the optical fiber strand 25 having radiation resistance is inserted in the thin tube 24, which excels in heat resistance, water resistance, airtightness, earthquake resistance, and pressure resistance, without a resin coating. This provides protection of the optical fiber strand 25 and also provides the optical fiber strand 25 with pressure resistance, water resistance, heat resistance, and radiation resistance.

According to the optical fiber penetration 1 of the present invention, the high-viscosity epoxy resin 42 and the low-viscosity epoxy resin 43 of the plug 27 provide separation between the inside of the thin tube 24 of each of the first optical fiber cables 13 and the inside of the thin tube 24 of corresponding one of the second optical fiber cables 14, while each of the internal connectors 15 connects the optical fiber strand 25 of one of the first optical fiber cables 13 with the optical fiber strand 25 of corresponding one of the second optical fiber cables 14. Accordingly, even when the thin tube 24 of one of the inner optical fiber cable 6 inside the nuclear reactor containment to be connected to one of the first optical fiber cables 13 is damaged, the atmosphere and the water in the nuclear reactor containment is prevented from entering the outer optical fiber cables 7 outside the nuclear reactor containment through the damaged thin tube, and thus the airtightness can be maintained.

Furthermore, since the thermosetting resin 16 fills the cylindrical body 12, the airtightness inside the internal connectors 15, the first optical fiber cables 13, and the second optical fiber cables 14 can be further improved to protect the optical fiber.

Note that the present invention is not limited to the above embodiment, and various modifications can be made. For example, although the above embodiment employs a configuration in which the cylindrical body 12 of the optical fiber penetration 1 is formed of three pipes, i.e., the first pipe 12a, the second pipe 12b, and the third pipe 12c, the cylindrical body 12 may be formed of four or more pipes, or may be formed of two pipes or a single pipe. The partition plates 23a, 23b in the cylindrical body 12 are not necessarily required.

Figure 7:
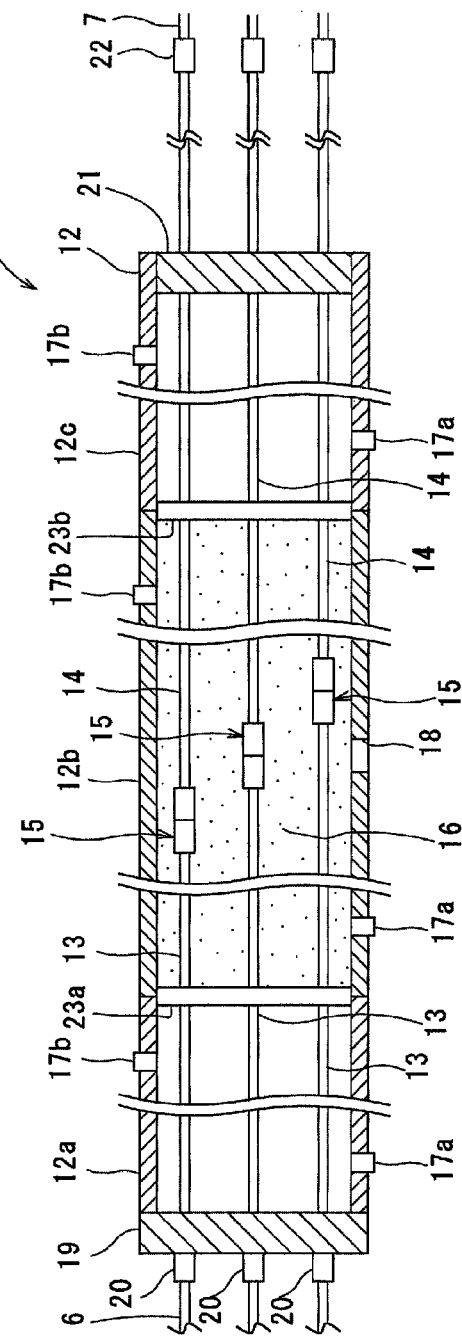
FIG. 7 is a sectional view of an optical fiber penetration according to a modification example.

Although the above embodiment employs a configuration in which the resin 16 fills all of the first, the second, and the third pipes of the cylindrical body 12, which are divided by the partition plates 23a, 23b, the resin 16 may fill only the second pipe 12b which is the middle one of the pipes and includes the internal connectors 15 without filling the first pipe 12a and the third pipe 12c on both sides, as shown in FIG. 7.

The present invention can be applied not only to the partition wall of the nuclear reactor containment, but also to a partition wall provided in a container, a facility, or a room such as a shelter, a safe, an airtight area of a chemical plant, which requires separation between the inside and the outside thereof.

REFERENCE SIGNS LIST 1 optical fiber penetration
2 partition wall
5 sleeve
6 inner optical fiber cable
7 outer optical fiber cable
12 cylindrical body
13 first optical fiber cable
14 second optical fiber cable
15 internal connector
16 thermosetting resin
19 first lid
20 first connector
21 second lid
22 second connector
23a, 23b partition plate
24 thin tube
25 optical fiber strand
26 socket
27 plug
31 female contact
42 high-viscosity epoxy resin
43 low-viscosity epoxy resin
48 male contact
A inner unit
B outer unit

The invention claimed is:

1. An optical fiber penetration to be disposed in a sleeve provided through a partition wall that separates a first space and a second space, the optical fiber penetration comprising:
a first optical fiber cable and a second optical fiber cable each having a thin tube formed of metal and an optical fiber strand inserted in the thin tube;
a cylindrical body that is formed of metal and is disposed in an axial direction of the sleeve, an interior of which includes the first optical fiber cable on a side of the first space and the second optical fiber cable on a side of the second space;
an internal connector configured to connect the first optical fiber cable with the second optical fiber cable in the interior of the cylindrical body; and
a first lid and a second lid configured to close one end and the other end of the cylindrical body respectively,
wherein the internal connector separates an interior of the thin tube of the first optical fiber cable and an interior of the thin tube of the second optical fiber cable, and electrically connects the optical fiber strand of the first optical fiber cable with the optical fiber strand of the second optical fiber cable.

2. The optical fiber penetration according to claim 1, wherein the internal connector includes:
a socket to which an end of the thin tube of the first optical fiber cable is fixed, and which includes either a female contact or a male contact at a tip end of the optical fiber strand of the first optical fiber cable; and
a plug to which an end of the thin tube of the second optical fiber cable is fixed, and which includes either a male contact or a female contact engaged with the contact in the socket, at a tip end of the optical fiber strand of the second optical fiber cable,
wherein a periphery of the optical fiber strand of the second optical fiber cable is sealed with a resin to an interior of the plug, and
wherein the plug is configured to be attached to the socket in such a manner that the female contact and the male contact are engaged with each other.

3. The optical fiber penetration according to claim 1, wherein the interior of the cylindrical body is filled with a resin.

4. The optical fiber penetration according to claim 3, further comprising:
a partition plate that is provided in the interior of the cylindrical body to support the first optical fiber cable and the second optical fiber cable and also divide the interior of the cylindrical body into a plurality of spaces,
wherein the resin fills at least one space including the internal connector among the spaces divided by the partition plate.

5. The optical fiber penetration according to claim 3, wherein the resin is a mixed resin in which a cyanate ester resin and an epoxy resin are mixed with each other.

6. The optical fiber penetration according to claim 2, wherein the interior of the cylindrical body is filled with a resin.

7. The optical fiber penetration according to claim 6, further comprising:
a partition plate that is provided in the interior of the cylindrical body to support the first optical fiber cable and the second optical fiber cable and also divide the interior of the cylindrical body into a plurality of spaces,
wherein the resin fills at least one space including the internal connector among the spaces divided by the partition plate.

8. The optical fiber penetration according to claim 6, wherein the resin is a mixed resin in which a cyanate ester resin and an epoxy resin are mixed with each other.

9. The optical fiber penetration according to claim 4, wherein the resin is a mixed resin in which a cyanate ester resin and an epoxy resin are mixed with each other.

10. The optical fiber penetration according to claim 7, wherein the resin is a mixed resin in which a cyanate ester resin and an epoxy resin are mixed with each other.

* * * * *